United States Patent
Ignasiak et al.

(10) Patent No.: US 8,119,943 B2
(45) Date of Patent: Feb. 21, 2012

(54) DRAW-OUT MECHANISM FOR MOLDED CASE CIRCUIT BREAKERS

(75) Inventors: Tomasz Ignasiak, Bielsko-Biala (PL); Mahadeva Mittu, Karnataka (IN); Adam Skrudlik, Bielso-Biala (PL); Ramesh Sathyanarayana, Karnataka (IN); Rafal Burzynski, Slaskie (PL); Marcin Lagiewka, Slaskie (PL); Marcin Rodak, Slaskie (PL); Lars Pommerencke, Neumunster (DE)

(73) Assignee: General Electric Company, Schenectady, NY (US)

( * ) Notice: Subject to any disclaimer, the term of this patent is extended or adjusted under 35 U.S.C. 154(b) by 348 days.

(21) Appl. No.: 12/201,473

(22) Filed: Aug. 29, 2008

(65) Prior Publication Data
US 2010/0025203 A1 Feb. 4, 2010

(30) Foreign Application Priority Data

Aug. 1, 2008 (PL) .......................................... 385806

(51) Int. Cl.
*H01H 9/20* (2006.01)
(52) U.S. Cl. ................................... 200/50.17; 200/50.21
(58) Field of Classification Search ................ 200/50.17
See application file for complete search history.

(56) References Cited

U.S. PATENT DOCUMENTS

| 4,743,715 | A | * | 5/1988 | Gerbert-Gaillard et al. ........................... 200/50.26 |
| 5,097,382 | A | | 3/1992 | Leach et al. |
| 5,341,191 | A | * | 8/1994 | Crookston et al. .............. 335/16 |
| 5,440,088 | A | * | 8/1995 | Coudert et al. ............... 200/303 |
| 6,476,335 | B2 | * | 11/2002 | Letient ....................... 200/50.26 |
| 2001/0025773 | A1 | | 10/2001 | Rane et al. |

FOREIGN PATENT DOCUMENTS

| DE | 4331778 A1 | 10/1994 |
| PL | 198343 B1 | 6/2008 |
| WO | 0171869 A2 | 9/2001 |

OTHER PUBLICATIONS

Polish Search Report for Application No. P-385 806; Filing Date Aug. 1, 2008; Dated: Aug. 6, 2008; 1 pg.

* cited by examiner

*Primary Examiner* — Elvin G Enad
*Assistant Examiner* — Lisa Klaus
(74) *Attorney, Agent, or Firm* — Cantor Colburn LLP

(57) ABSTRACT

A draw-out mechanism for a molded case circuit breaker includes a fixed side plate and a plurality of auxiliary contacts mounted to the fixed side plate. The draw-out mechanism also includes a movable member moveably mounted to the fixed side plate. The movable member includes a cam member that acts upon the plurality of auxiliary contacts. The draw-out unit further includes a front panel member having a visual indicator mechanism and a locking mechanism provided with a padlock locking arm, a door lock and a second lever. In addition, the draw-out unit includes a connector plate that operatively couples the movable member and the front panel member. The connector plate includes a plurality of adjustment portions that establish a desired extension of the connector plate relative to the movable member to accommodate a predetermined spacing between the movable member and the front panel member.

17 Claims, 6 Drawing Sheets

DRAW-OUT MECHANISM FOR MOLDED CASE CIRCUIT BREAKERS

CROSS REFERENCE TO RELATED APPLICATIONS

This application claims priority to Application No. P 385806, filed Aug. 1, 2008 in the Poland Patent Office, the contents of which are incorporated herein by reference thereto.

BACKGROUND OF THE INVENTION

Exemplary embodiments of the present invention relate to the art of circuit breakers and, more particularly, to a draw-out mechanism for molded case circuit breakers.

Conventional electrical distribution systems employ switch gears that house a plurality of draw-out units. Each draw-out unit houses one or more electrical switching devices such as motor controllers and/or circuit breakers. The draw-out units releasably connected the electrical switching devices to an electrical busbar. Periodically, the draw-out units are operated to disconnect the electrical switching devices from the busbar for maintenance, servicing or replacement purposes. Toward that end, the draw-out units have discrete positions for installing and removing an associated switching device. Certain draw-out units also includes a test position wherein an associated circuit breaker is disconnected from a main circuit, yet can still be closed, opened, or tripped in order to test/check internal and external accessories such as auxiliary switches provided on the circuit breaker.

BRIEF DESCRIPTION OF THE INVENTION

In accordance with one exemplary embodiment of the invention, a draw-out mechanism for a molded case circuit breaker includes a fixed side plate configured for mounting a circuit breaker within a switchgear cabinet. The draw-out mechanism also includes a plurality of auxiliary contacts mounted to the fixed side plate. The plurality of auxiliary contacts include an actuation mechanism, and are switchable between a first position and a second position. The draw-out mechanism further includes a movable member moveably mounted to the fixed side plate. The movable member moves between a first configuration wherein the circuit breaker is in a connect configuration and a second position wherein the circuit breaker is in a disconnect configuration. The movable member includes a cam member that acts upon the actuation mechanism to switch the plurality of auxiliary contacts between the first and second positions in response to moving the circuit breaker between the connected configuration and the disconnect configuration. The draw-out unit still further includes a front panel member having a visual indicator mechanism provided with a visual indicator member, and a locking mechanism provided with a padlock locking arm, a door lock, and at least one lever. The at least one lever selectively shifting the locking mechanism to a lock out position wherein the padlock locking arm is exposed and the door lock is engaged. In addition, the draw-out unit includes a connector plate that operatively couples the movable member and the front panel member. The connector plate includes a plurality of adjustment portions that establish a desired extension of the connector plate relative to the movable member to accommodate a predetermined spacing between the movable member and the front panel member. The connector member acts on the first lever to shift the visual indicator between the plurality of position indication positions, and upon the second lever to shift the locking mechanism to the lock out position.

In accordance with another exemplary embodiment of the invention, a draw-out mechanism for a molded case circuit breaker includes a fixed side plate configured for mounting a circuit breaker within a switchgear cabinet. The draw-out mechanism also includes a plurality of auxiliary contacts mounted to the fixed side plate. The plurality of auxiliary contacts include an actuation mechanism and are switchable between a first position and a second position. The draw-out mechanism further includes a movable member moveably mounted to the fixed side plate. The movable member moves between a first configuration, wherein the circuit breaker is in a connect configuration, and a second position wherein the circuit breaker is in a disconnect configuration. In addition, the draw-out unit includes a cam member fixedly mounted relative to the slider mechanism. The cam member acts upon the actuation mechanism to switch the auxiliary contacts between the first and second positions in response to moving the circuit breaker between the connect configuration and the disconnect configuration.

In accordance with still another embodiment of the invention, a draw-out mechanism for a molded case circuit breaker includes a fixed side plate configured for mounting a circuit breaker within a switchgear cabinet. The draw-out mechanisms further includes a movable member moveably mounted to the fixed side plate. The movable member moves between a first configuration wherein the circuit breaker is in a connect configuration, and a second position wherein the circuit breaker is in a disconnect configuration. The draw-out mechanism further includes a front panel member having a visual indicator mechanism, and a connector plate operatively coupled between the movable member and the front panel member. The connector plate includes a plurality of adjustment portions that establish a desired extension of the connector plate relative to the movable member to accommodate a predetermined spacing between the movable member and the front panel member.

In accordance with yet another exemplary embodiment of the invention, a draw-out mechanism for a molded case circuit breaker includes a fixed side plate configured for mounting a circuit breaker within a switchgear cabinet. The draw-out mechanism also includes a movable member moveably mounted to the fixed side plate. The movable member moves between a first configuration wherein the circuit breaker is in a connect configuration, and a second position wherein the circuit breaker is in a disconnect configuration. The draw-out mechanism further includes a front panel member having a visual indicator mechanism provided with a visual indicator member, and a locking mechanism provided with a padlock locking arm, a door lock, and at least one lever. The at least one lever selectively shifting the locking mechanism to a lock out position wherein the padlock locking arm is exposed and the door lock is engaged.

DETAILED DESCRIPTION OF THE INVENTION

Figure 1:
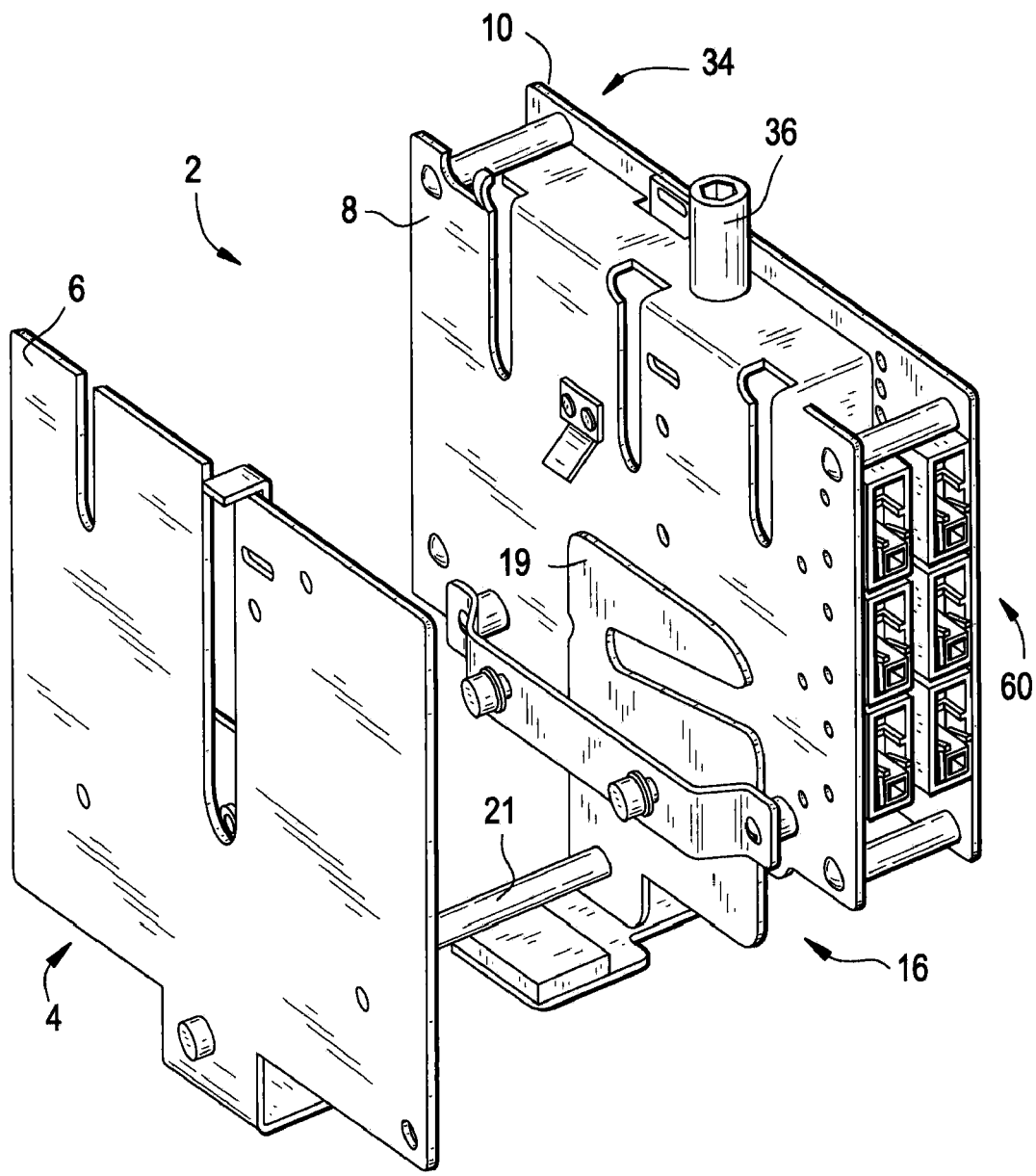
FIG. 1 is a lower left perspective view of a circuit breaker plug-in system including a draw-out mechanism constructed in accordance with exemplary embodiments of the invention.

With initial reference to FIGS. 1 and 2, a circuit breaker plug-in system constructed in accordance with exemplary embodiments of the invention is indicated generally at 2. Plug-in system 2 includes a plug-in base 4 having a first side plate 6, a second side plate 8 and a third side plate 10. First and second side plates 6 and 8 are spaced so as to receive a circuit breaker (not shown). Second and third side plates 8 and 10 are also maintained in a spaced relationship. As such, second and third side plates 8 and 10 are interconnected via a plurality of rivets and spacers (not separately labeled). Plug-in system 2 further includes a racking mechanism 16. As shown, racking mechanism 16 includes a first cam plate 19 operatably connected to a second cam plate (not shown) via a shaft 21. Racking mechanism 16, as will be discussed more fully below, is selectively shifted to move the circuit breaker into, and out of, contact with an electrical bus (not shown). More specifically, racking mechanism 16 moves the circuit breaker between three discrete configuration relative to the electrical bus; a first or CONNECT configuration in which contacts on the circuit breaker are connected to the electrical bus, second or TEST configuration in which main contacts on the circuit breaker are not connected to the electrical bus while auxiliary contacts and accessories on the circuit breaker are operational for testing purposes, and a third or DISCONNECT configuration in which the circuit breaker is completely disconnected from the electrical bus and all auxiliary contacts are inoperable.

Figure 2A:
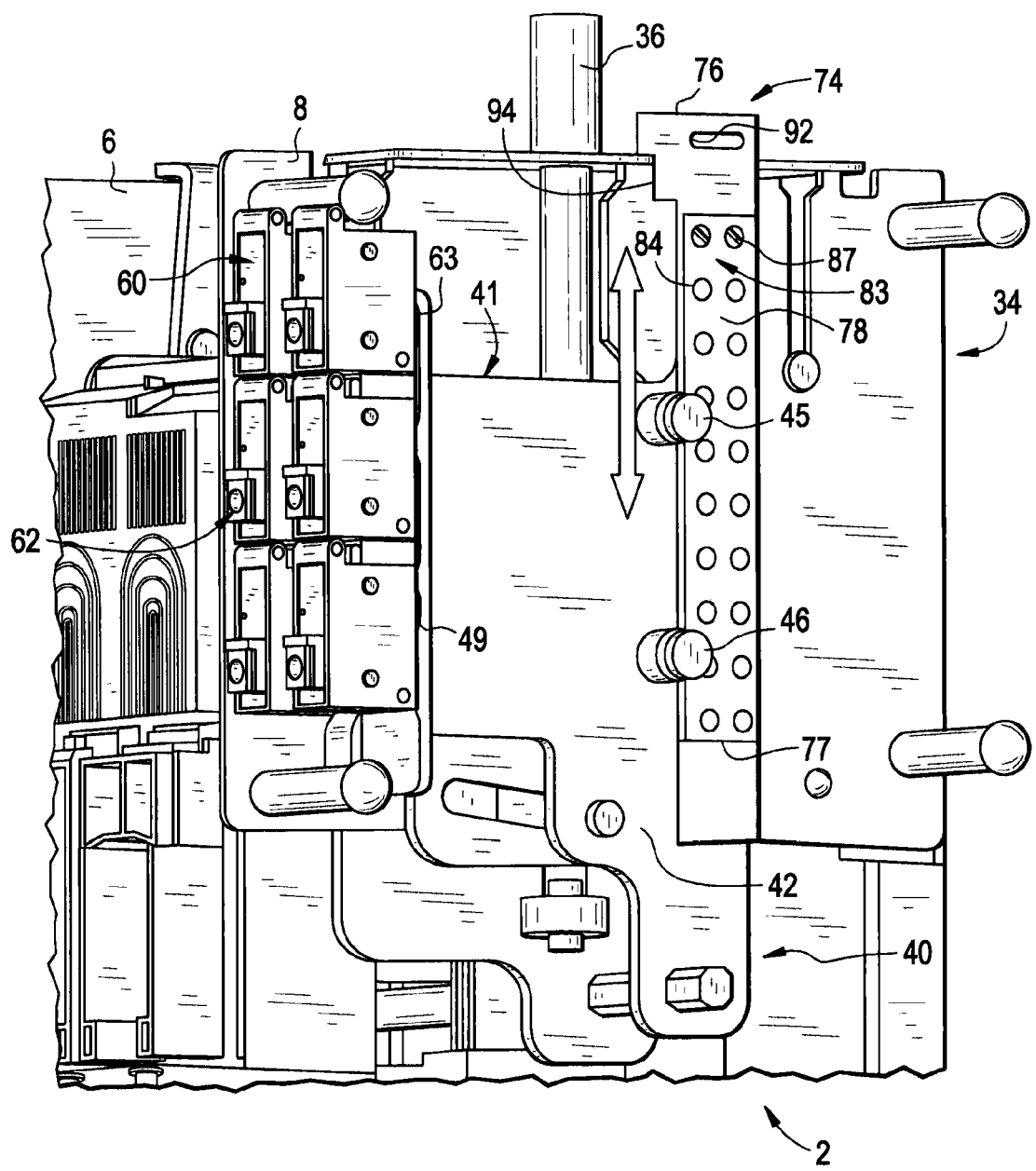
FIG. 2A is a partially cut away left perspective view of the draw-out mechanism of FIG. 1.
Figure 2B:
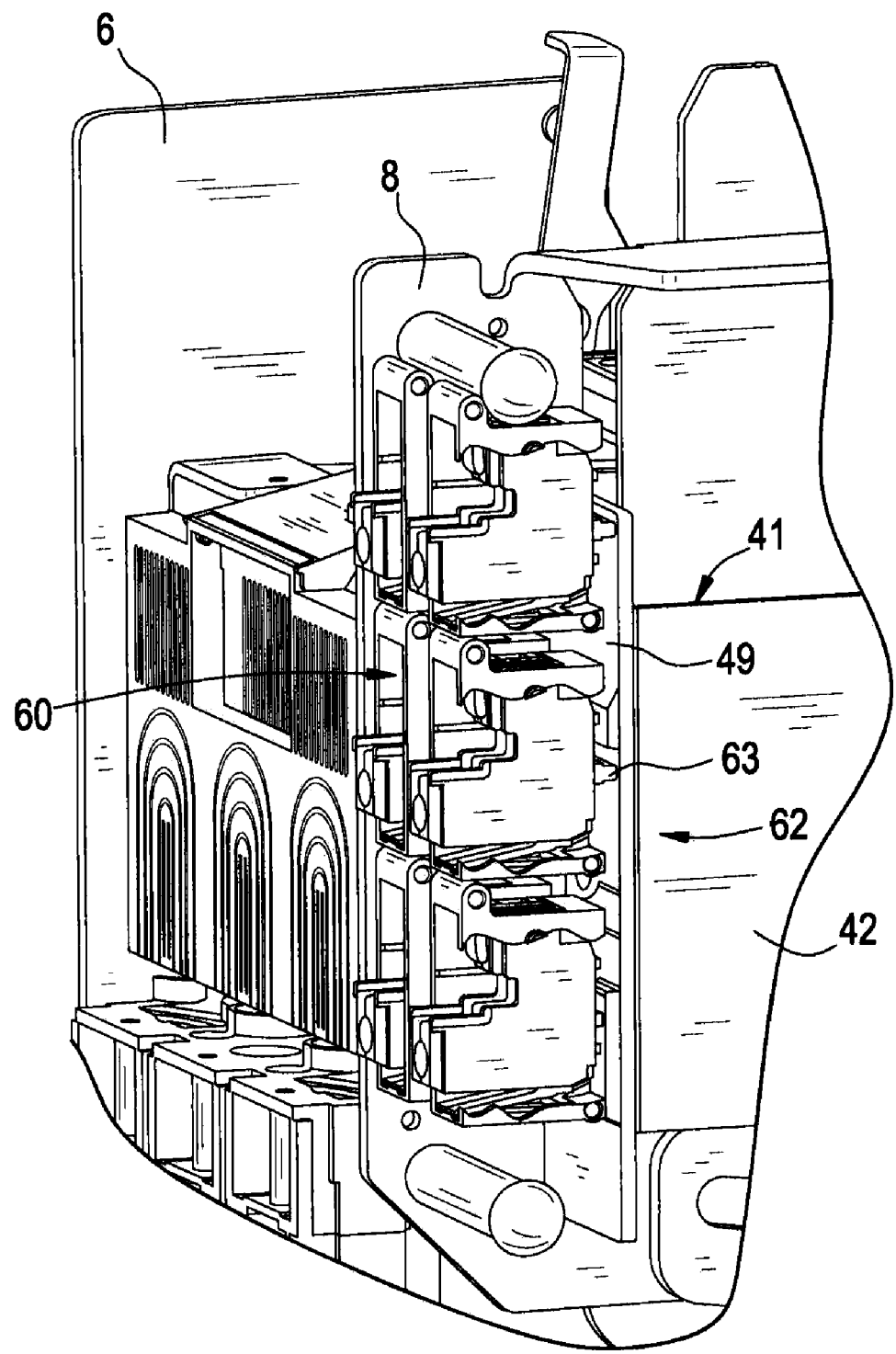
FIG. 2B is an enlarged view of the partially cut away left perspective view of FIG. 2A.

Racking mechanism 16 is operated via a draw-out mechanism 34. Draw-out mechanism 34 includes a crank 36 operatably connected to a lead screw (not shown) that, in turn, is connected to racking mechanism 16. The lead screw translates rotational movement of crank 36 to linear movement of racking mechanism 16 in order to establish or move the circuit breaker between the various CONNECT, TEST and DISCONNECT configurations. As best shown in FIGS. 2A and 2B, draw-out mechanism 34 further includes a movable member 40 having a main body 41 including a substantially planar surface 42. Movable member 40 further includes a pair of guide rivets 45 and 46 that project outward from planar surface 42 and engage with slots (not shown) formed on third side plate 10. Guide rivets 45 and 46 facilitate smooth transitioning of movable member 40 relative to plug-in base 4. In addition, slide member 40 is shown to include a cam member 49. Cam member 49, as will be discussed more fully below, translates with movable member 40 in response to linear movements of racking mechanism 16.

In the exemplary embodiment shown, draw-out mechanism 34 includes an auxiliary contact system indicated generally at 60. Auxiliary contact system 60 is mounted between second and third side plates 8 and 10 and includes a plurality of normally open (NO) and/or normally closed (NC) electrical contacts indicated generally at 62. Auxiliary contact system 60 includes an activator member or switch 63 that, when actuated, changes a position of the plurality of electrical contacts 62. That is, electrical contacts 62 are selectively switchable between a first position in which the plurality of electrical contacts 62 are in a first state, and a second position in which the plurality of electrical contacts 62 are in a second state. More specifically, cam member 49 selectively engages the activator member in order to change a position of the plurality of electrical contacts 62. In this manner, when racking mechanism 16 is in a first position, for example one of the CONNECT, TEST and DISCONENCT configurations, electrical contacts 62 are in the first state. When racking mechanism 16 is moved to another position, i.e. another of the CONNECT, TEST and DISCONNECT configurations, electrical contacts 62 are shifted to the second state through operation of movable member 40 and cam member 49.

Figure 3:
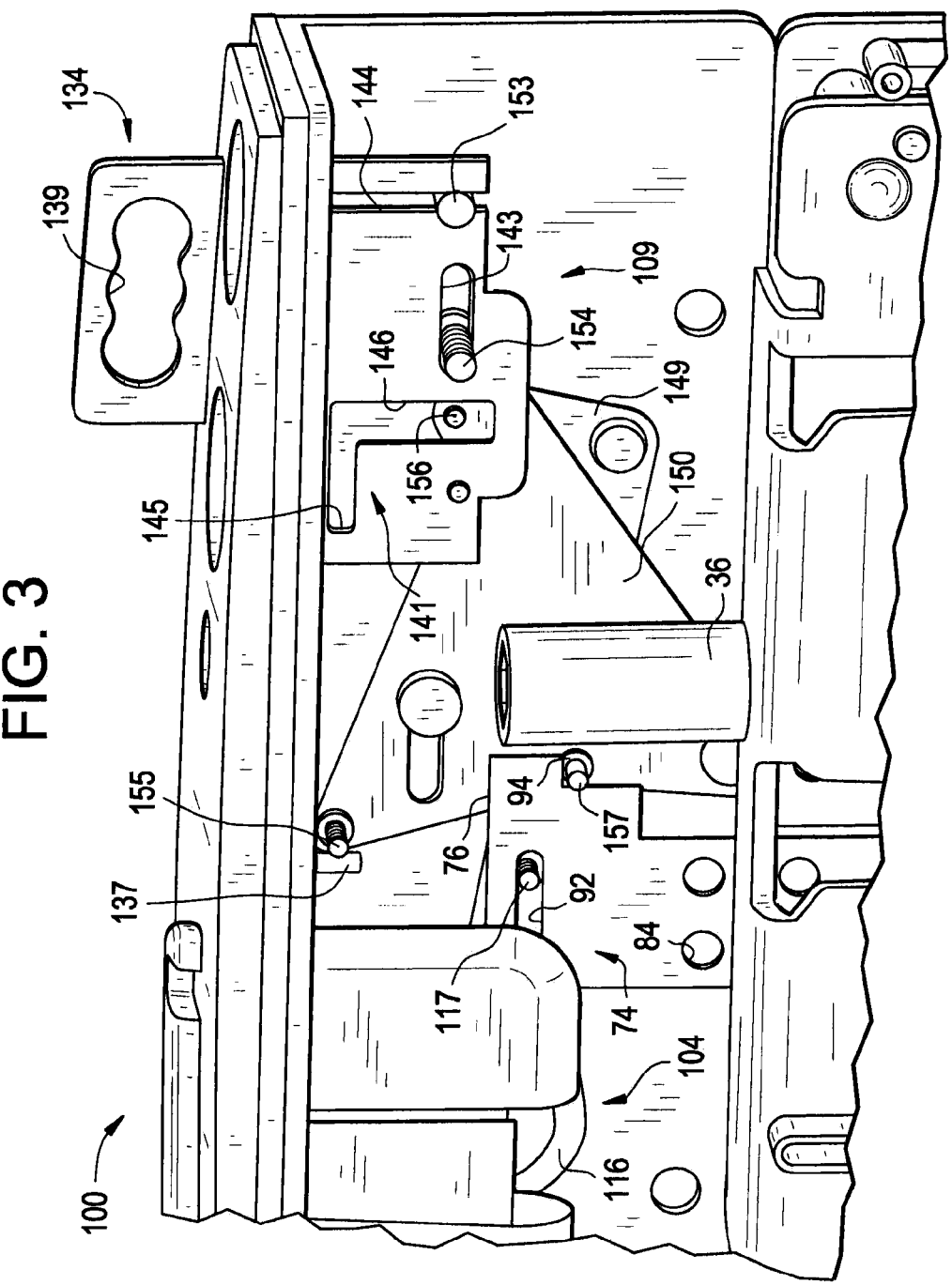
FIG. 3 is a detail view of a front panel portion of the draw-out mechanism illustrating a visual indication mechanism in a first position and a locking mechanism in a locked configuration.

In accordance with another exemplary aspect of the invention, draw-out mechanism 34 includes a connector plate 74. As best shown in FIGS. 2 and 3, connector plate 74 is selectively adjustable. More specifically, connector plate 74 includes a first end portion 76 that extends to a second end portion 77 through an intermediate portion or adjustment zone 78. Adjustment zone 78 includes a plurality of adjustment portions 83 shown in the form of openings 84. Adjustment zone 78 enables connector plate 74 to selectively extend a predetermined distance from movable member 40. That is, a relative distance between plug-in system 2 and a front cabinet panel (not shown) varies from installation to installation. As will be discussed more fully below, adjustment zone 78 enables connector plate 74 to accommodate installation variables. Towards that end, connector plate 74 is fixed to movable member 40 via, for example, a mechanical fastener 87. Mechanical fastener 87 is shown to take the form of a screw, however it should be appreciated that various other mechanical fasteners, including both readily detachable fasteners such as bolts and the like, and fixed fasteners such as rivets can be employed. Screw 87 extends through a select one of openings 84 and connected with a corresponding threaded opening (not shown) on movable member 40. In this manner, a desired positioning of connector plate 74 relative to plug-in system 2 is achieved. Connector plate 74 is further shown to include a connector member 92 and a cam section 94 at first end portion 76. Connector member 92 and cam section 94, in a manner that will be detailed more fully below serve as an interface to a front panel member 100. Front panel member 100 provides a visual indication of a current state of racking mechanism 16 as well as a lockout feature that prevents unauthorized access to the circuit breaker.

Figure 4:
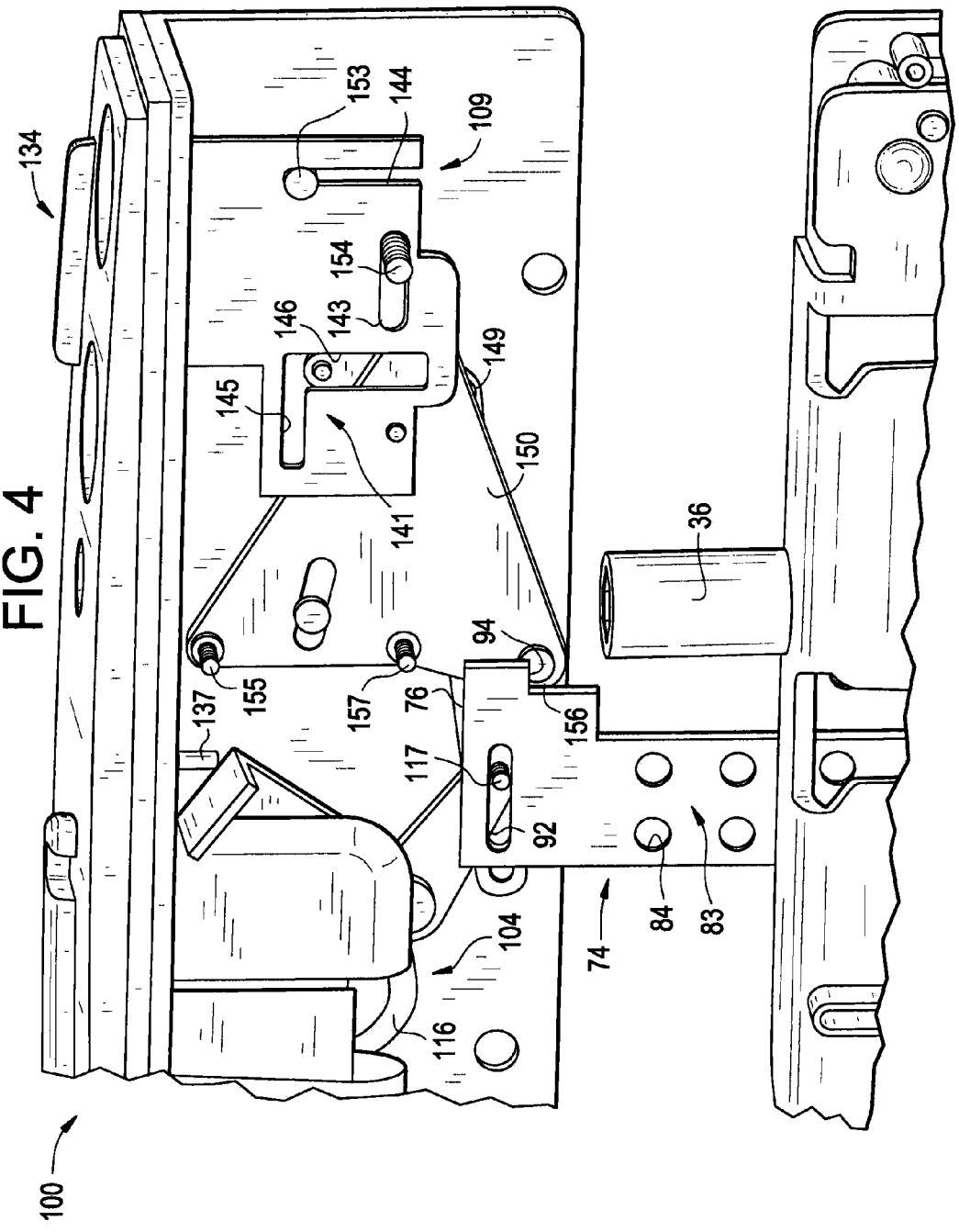
FIG. 4 is a detail view of the front panel portion of FIG. 3 illustrating the visual indication mechanism in a second position and a locking mechanism in an un-locked configuration.
Figure 5:
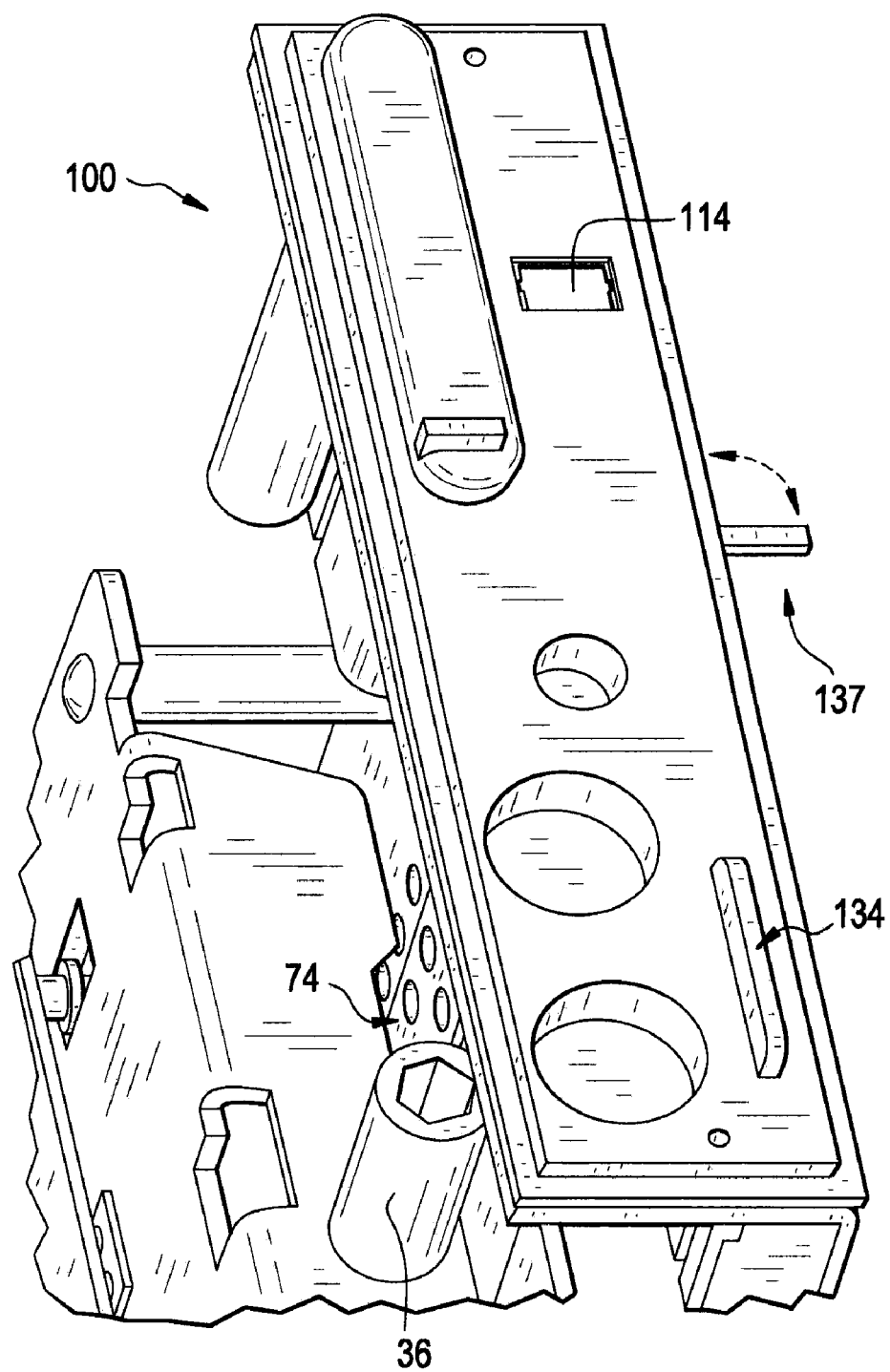
FIG. 5 is a lower left perspective view of the front panel portion of FIG. 3.

As best shown in FIGS. 3-5, front panel member 100 includes a visual indicator mechanism 104 that presents a visual or graphic indication of the current state, i.e., CONNECT, TEST or DISCONNECT of the associated circuit breaker. Front panel member 100 also includes a locking mechanism 109. Visual indicator mechanism 104 includes a visual indicator member 114 operatively connected to a lever 116 having a pin 117. Pin 117 is operatively connected to connector member 92 on connector plate 74. In this manner, movements of movable member 40 are translated through connector plate 74 to lever 116. Thus, when draw-out mechanism 34 shifts racking mechanism 16 to the CONNECT configuration, connector plate 74 shifts lever 116 so as to move visual indicator member 114 to display a corresponding CONNECT indication. Correspondingly, when draw-out mechanism 34 shifts racking mechanism to move the circuit breaker to the TEST configuration, connector plate 74 shifts lever 116 to move visual indicator member 114 to display a corresponding TEST indication. A similar indication is provided for the DISCONNECT configuration. In this manner, service personnel are provided with a visual indication of a position of the circuit breaker. Moreover, by connecting auxiliary contacts 60 through movable member 40 an electrical indication of the circuit breaker can also be provided to remote service personnel. This exemplary embodiment of the invention, provides both a local (visual) indicator and a remote (electrical) indication of the current state of racking mechanism 16 and the associated circuit breaker.

In further accordance with the exemplary embodiment shown, locking mechanism 109 includes a padlock locking arm 134 and a door lock 137. Padlock locking arm 134 includes a lock portion 139 configured to accept three distinct padlocks. Padlock locking arm 134 also includes a first or L-shaped cutout 141, a second or oval cutout 143 and a third cutout 144. As shown, L-shaped cutout 141 includes a first section 145 and a second section 146 and is operatively engaged to a padlock lever 149. Second cutout 143 is engaged to a locking lever 150. Third cutout 144 receives a guide pin 153 fixedly mounted to front panel member 100. Guide pin 153 ensures a smooth, linear transition of padlock locking arm 134 into and out from front panel 100. As shown, padlock lever 149 includes a pin 154 that extends through second cutout 143. With this arrangement, linear movement of padlock locking arm 134 is translated to rotating movement of padlock lever 149. Padlock lever 149 in turn, engages locking lever 150. Locking lever 150 includes a first pin 155 that engages door lock 137, a second pin 156 that extends through first cutout 141 and a third pin 157 that is positioned to engage connector plate 74.

In accordance with the exemplary embodiment shown, when racking mechanism 16 is shifted to a disconnect position such as shown in FIG. 3, padlock locking lever 149 rotates allowing pin 156 to travel within second section 146 of first cutout 141 freeing lock portion 139 to extend up and project outward from front panel member 100. At this point, service personnel install padlocks through lock portion 139 in order to prevent unauthorized reconnection of the circuit breaker. At the same time, locking lever 150 rotates urging pin 155 into contact with door lock 137 and pin 157 is positioned at cam section 94. Door lock 137 rotates outward to engage an associated door. In this manner, unless additional measures are taken, the door cannot be opened while the circuit breaker is disconnected. When service is complete, the padlocks are removed and padlock locking arm 134 is inserted into front panel member 100. Initially, padlock locking arm 134 is prevented from substantial movement given the relative positioning of pin 157 and connector plate 74. At this point, an additional release (not shown) is activated in order to enable padlock locking arm 134 to be fully inserted into front panel member 100. Once inserted, pin 156 moves to first section 145 of first cutout 141 to retain padlock locking arm 134 in a retracted position.

With this arrangement, exemplary embodiments of the invention provide a draw-out mechanism including both remote (electrical) indication of breaker position and local (visual) indication of breaker position. In addition, exemplary embodiments of the invention provide a draw-out mechanism provide a system for accommodating various spacing between the front panel member and/or door and the circuit breaker as well as additional lockout features to provide servicing enhancements.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A draw-out mechanism for a molded case circuit breaker comprising:
   a fixed side plate configured to mount the circuit breaker within a switchgear cabinet;
   an auxiliary contact system mounted to the fixed side plate, the auxiliary contact system including an activator member and auxiliary contacts switchable between a first position and a second position;
   a movable member moveably mounted to the fixed side plate, the movable member being moveable between a first position wherein the circuit breaker is in a connect configuration, and a second position wherein the circuit breaker is in a disconnect configuration; and
   a cam member fixedly mounted relative to the movable member, the cam member actionable upon the activator member to switch the auxiliary contacts between the first and second positions in response to a movement of the circuit breaker between the connect configuration and the disconnect configuration.

2. The draw-out mechanism according to claim 1, wherein the auxiliary contacts include normally open (NO) and normally closed (NC) contacts.

3. The draw-out mechanism according to claim 1, further comprising: a visual indicator mechanism including a visual indicator member, the auxiliary contact system being operatively connected to the visual indicator mechanism.

4. The draw-out mechanism according to claim 3, further comprising: a racking mechanism, the racking mechanism configured to establish a circuit breaker configuration, the racking mechanism being operatively coupled to both the visual indication mechanism and the auxiliary contact system.

5. A draw-out mechanism for a molded case circuit breaker comprising:
   a fixed side plate configured to mount a circuit breaker within a switchgear cabinet;
   a movable member moveably mounted to the fixed side plate, the movable member being moveable between a first position wherein the circuit breaker is in a connect configuration, and a second position wherein the circuit breaker is in a disconnect configuration;
   a front panel member including a visual indicator mechanism; and
   a connector plate directly connected to the movable member and directly connected to the front panel member, the connector plate including a plurality of adjustment portions to accommodate a predetermined spacing between the movable member and the front panel member.

6. The draw-out mechanism according to claim 5, wherein the connector plate includes a first end portion, a second end portion, and an adjustment zone disposed between the first end portion and the second end portion, the plurality of adjustment portions being arranged along the adjustment zone.

7. The draw-out mechanism according to claim 6, wherein the plurality of adjustment portions comprise a plurality of openings that extend along the adjustment zone.

8. The draw-out mechanism according to claim 5, wherein the connector plate is secured to the movable member by a mechanical fastener.

9. The draw-out mechanism according to claim 8, wherein the mechanical fastener is a screw.

10. A draw-out mechanism for a molded case circuit breaker comprising:
- a fixed side plate configured to mount the circuit breaker within a switchgear cabinet;
- a movable member moveably mounted to the fixed side plate, the movable member being moveable between a first configuration wherein the circuit breaker is in a connect configuration, and a second position wherein the circuit breaker is in a disconnect configuration; and
- a front panel member including a visual indicator mechanism having a visual indicator member, and a locking mechanism having a padlock locking arm, a door lock, and at least one lever, the at least one lever configured to selectively shift the locking mechanism to a lock out position wherein the padlock locking arm is exposed and the door lock is engaged;
- a connector plate connected to the movable member and to the front panel member;
- a plurality of electrical contacts operatively connected to the visual indicator member through the connector plate; and
- a racking mechanism configured to establish one of the connect configuration and the disconnect configuration, the racking mechanism being operatively coupled to both the visual indicator mechanism and the plurality of electrical contacts.

11. The draw-out mechanism according to claim 10, further comprising: a connector plate disposed to extend from the movable member to the front panel member, the visual indicator mechanism including a lever operatively connected between the visual indicator member and the connector plate.

12. The draw-out mechanism according to claim 10, wherein the padlock locking arm includes a first cutout, a second cutout, and a third cutout.

13. The draw-out mechanism according to claim 12 wherein the at least one lever includes a padlock lever and a locking lever, the padlock lever including a pin configured to extend through the second cut out on the padlock locking arm.

14. The draw-out mechanism according to claim 13, wherein the locking lever includes a first pin, a second pin, and a third pin, at least one of the first pin, second pin and third pin being configured to operatively connect the locking lever and the padlock locking arm.

15. The draw-out mechanism according to claim 14, wherein at least one of the first pin, second pin and third pin is configured to operatively connect the locking lever and the door lock.

16. The draw-out mechanism according to claim 14, wherein at least one of the first pin, second pin and third pin is configured to engage the connector plate, the at least one of the first pin, second pin and third pin being configured to prevent the padlock lever from being inserted into the front panel member.

17. A draw-out mechanism for a molded case circuit breaker comprising:
- a fixed side plate configured to mount the circuit breaker within a switchgear cabinet;
- an auxiliary contact system mounted to the fixed side plate, the auxiliary contact system including an activator member and a plurality of auxiliary contacts switchable between a first position and a second position;
- a movable member moveably mounted to the fixed side plate, the movable member being moveable between a first position wherein the circuit breaker is in a connect configuration, and a second position wherein the circuit breaker is in a disconnect configuration;
- a cam member fixedly mounted relative to the movable member, the cam member actionable upon the activator member to switch the plurality of auxiliary contacts between the first and second positions in response to a movement of the circuit breaker between the connect configuration and the disconnect configuration;
- a front panel member including a visual indicator mechanism having a visual indicator member, and a locking mechanism having a padlock locking arm, a door lock, and at least one lever, the at least one lever configured to selectively shift the locking mechanism to a lock out position wherein the padlock locking arm is exposed and the door lock is engaged; and
- a connector plate operatively coupled between the movable member and the front panel member, the connector plate including a plurality of adjustment portions to accommodate a predetermined spacing between the movable member and the front panel member, the connector member actionable on the first lever to selectively shift the visual indicator between a plurality of indication positions, and actionable on the second lever to selectively shift the locking mechanism to the lock out position.

* * * * *